Nov. 27, 1923.
P. H. DRUMM
1,475,803
ICE CREAM RECEPTACLE FILLING MEANS
Filed Feb. 3, 1923     3 Sheets-Sheet 1
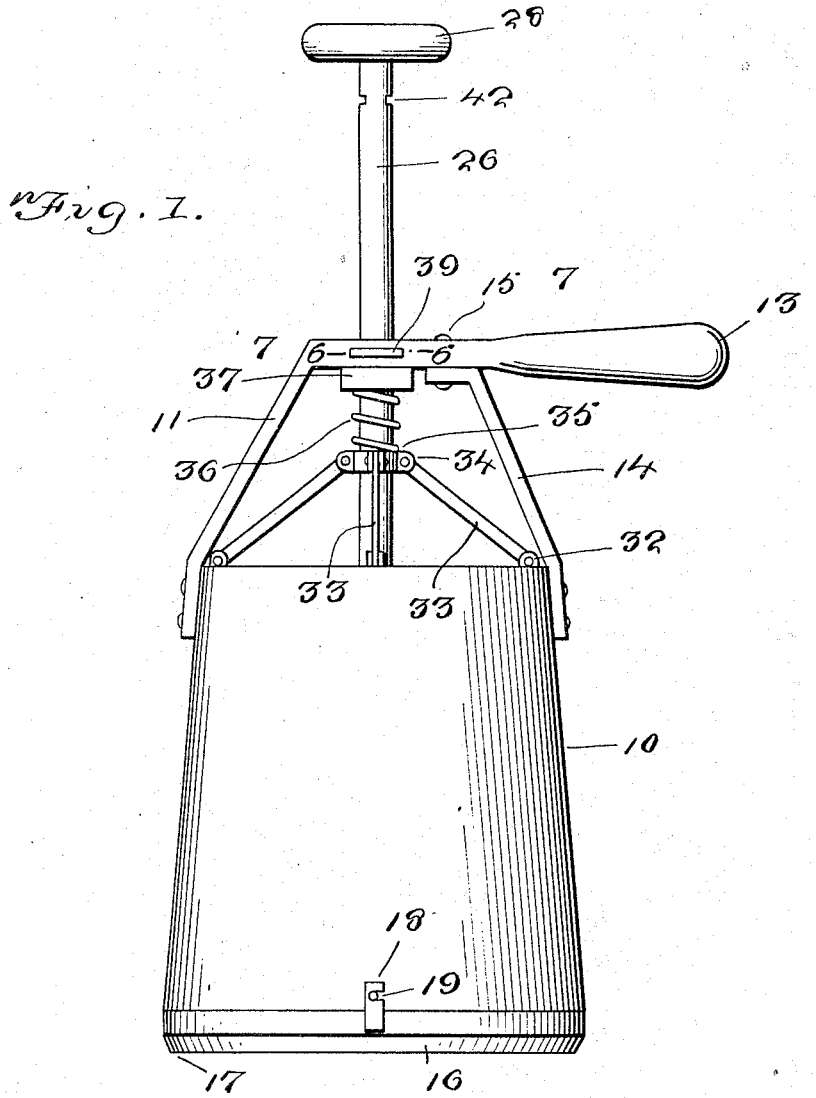
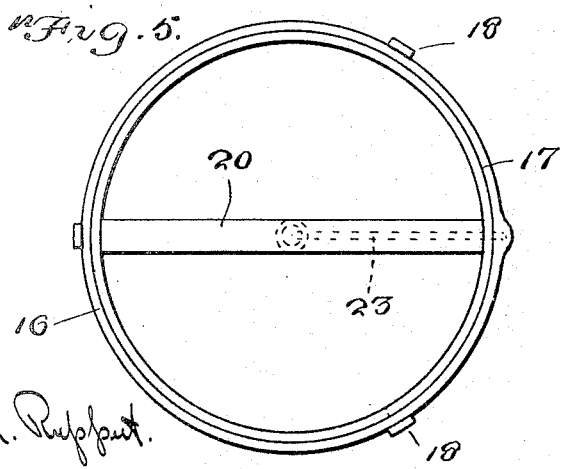
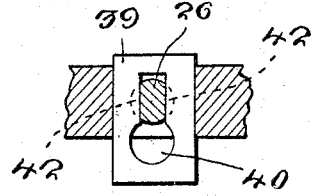
P. H. Drumm
INVENTOR
BY Victor J. Evans
ATTORNEY
WITNESS:

Nov. 27, 1923.
P. H. DRUMM
1,475,803
ICE CREAM RECEPTACLE FILLING MEANS
Filed Feb. 3, 1923    3 Sheets-Sheet 2
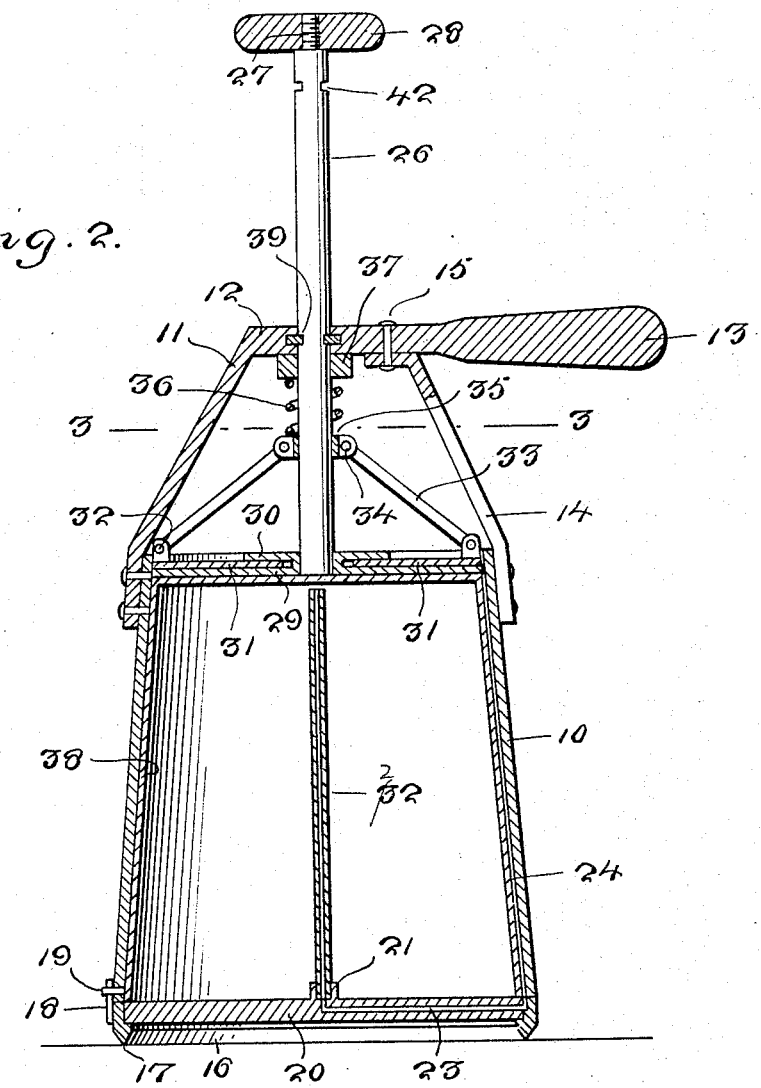
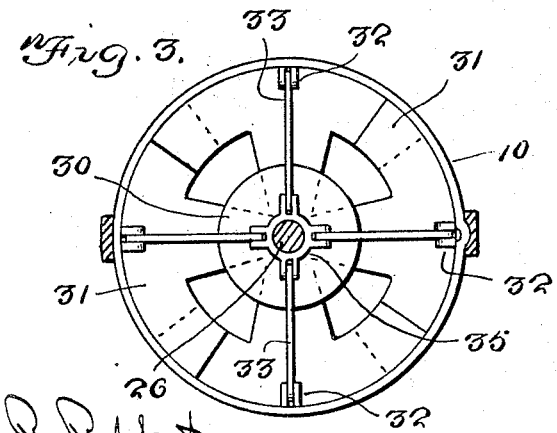
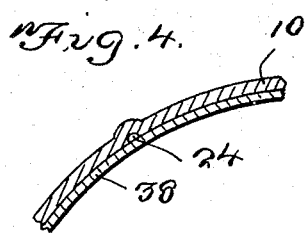
P. H. Drumm
INVENTOR
BY Victor J. Evans
ATTORNEY
WITNESS:

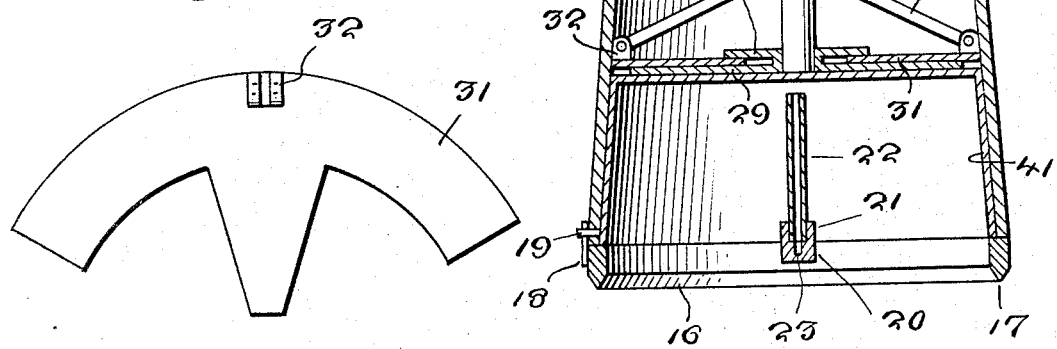

Patented Nov. 27, 1923.

1,475,803

UNITED STATES PATENT OFFICE.

PAUL H. DRUMM, OF WEST FRANKFORT, ILLINOIS.

ICE-CREAM-RECEPTACLE-FILLING MEANS.

Application filed February 3, 1923. Serial No. 616,791.

*To all whom it may concern:*

Be it known that I, PAUL H. DRUMM, a citizen of the United States, residing at West Frankfort, in the county of Franklin and State of Illinois, have invented new and useful Improvements in Ice-Cream-Receptacle-Filling Means, of which the following is a specification.

This invention relates to dispensing devices and has for its object the provision of a novel container and filling means therefor, the container being placed within the filling means which holds it in shape while it is being filled with ice cream or the like, the holder being provided with means for discharging the container when the latter is filled.

An important object is the provision of a device of this character which is provided with vent means for the escape of air while the ice cream is being filled in, this feature being important in preventing the formation of air spaces within the mass of material.

Another object is the provision of a holder which is so constructed that it may hold containers of full size or fractional size with equal ease.

Another object is the provision of a holder of this character equipped with removable cutting means by means of which the holder and container may be worked into the mass of material to effect filling of the container.

Another object is the provision of a device of this character which will be comparatively simple and inexpensive in manufacture, easy to operate, a great time and labor saver, and a general improvement in the art.

With the above and other objects and advantages in view the invention consists in the details of construction to be hereinafter more fully described and claimed and illustrated in the accompanying drawings, in which:

Figure 1 is a side elevation of the device,

Figure 2 is a longitudinal section therethrough,

Figure 3 is a cross section on the line 3—3 of Figure 2,

Figure 4 is a detail cross section showing the vent means,

Figure 5 is an end elevation showing the cutting means,

Figure 6 is a detail sectional view on the line 6—6 of Figure 1 showing the plunger locking means, Figure 7 is a longitudinal section showing the plunger as locked in a position permitting the holder to accommodate a fractional size container and Figure 8 is a detail plan view of one of the shoes.

Referring more particularly to the drawings I have shown my device as comprising a frusto conical shell 10 open at both ends and having secured to its upper end an angular member 11 which is formed intermediate its ends with a bearing portion 12 and which terminates in a handle 13. Secured upon the shell at a diametrically opposite point from the point of attachment from the member 11 is a similarly shaped brace 14 which is riveted or otherwise secured to the juncture of the handle and bearing portions as shown at 15.

Mounted at the open lower end of the shell 10 is a cutting ring 16 having its edge beveled from both sides to provide a sharp cutting edge 17. This ring is held detachably upon the shell by means of slotted ears 18 carried by the ring, engaging exteriorly upon the shell and engaged upon pins 19 carried by the shell. By partially rotating this ring it is apparent that it may be removed for cleaning or other purposes. Extending transversely of the cutting ring at its center is a bar 20 formed centrally with a boss 21 within which is secured one end of a tube 22 which extends co-axially of the shell 10 and which terminates short of the upper end thereof. The bar 20 is formed with a longitudinal passage 23 communicating with the bore of the tube 22 and extending to the shell where it communicates with a vent passage 24 formed in the shell by pressing the material thereof outwardly.

The numeral 26 designates a stem or plunger rod which has its upper end formed with a reduced threaded extension 27 carrying a knob or other handle 28. This stem is slidable through the bearing member 12 and has its lower end carrying a disk 29 which is normally disposed at the upper or smaller end of the shell. The disk 29 carries an overhanging collar or flange 30 which serves normally to confine a plurality of arcuate plates or shoes 31 which are slidable radially upon the plate 29 and which overlap as shown. These shoes or plates are provided with pairs of ears 32 spaced apart as shown and between which are pivoted links 33 which are in turn pivotally connected with ears 34 on a collar 35 slidable on the stem 26 and normally urged downwardly by a spring 36 which abuts against a stop collar 37 rigidly secured upon the stem and normally engaging against the underside of the bearing portion 12.

The container for use in connection with my holder is designated by the numeral 38 and is of a size and shape to be received comfortably within the shell 10, the ring 16 being removed to permit insertion of the container and being subsequently reapplied so that the bar 20 will operate to prevent the container from slipping out of the shell.

Slidable within a suitable slot or recess in the bearing portion 12 is a locking plate 39 formed with a key hole slot 40, the larger portion of the slot accommodating the stem 26 to permit sliding movement thereof. In some instances, as for instance when it is desired to use a container of a size which is only a fraction of the container 38, such for instance as the container 41 in Figure 7, it is highly desirable that the stem 26 be initially placed at such a position that the disk 29 will serve as an abutment for the closed end of the container. For this reason the stem 26 is provided with a groove 42 into which the small portion of the key hole slot 40 in the locking plate 39 is engaged, subsequent to movement of the plunger stem to bring the disk 29 against the container. When this is resorted to the knob 28 is removed and a section of stem is screwed onto the extension 27 and the knob 28 applied to the extension.

Regardless of whether this be done or not, in the use of the device it is apparent that after the container is placed within the shell, the operator grasps the device by the handle 13 and scoops it into the can or other receptacle which contains the ice cream or other material of a similar nature. When this is done and pressure is applied to the device, the cutting ring 16 operates to cut the material so that it will pass into the container 38 or 41 as the case may be. The air in advance of the ice cream being forced into the container escapes through the tube 22 and out through the passages 23 and 24 so that there will be no air compression to hinder filling the device. After the receptacle has been filled, the operator removes the ring 16 and presses upon the knob 28 whereupon the disk 29 forces the container out of the shell, the spring 36 urging the shoes 31 outwardly so that they always bear against the inner wall of the shell to prevent any possible buckling or other distortion of the bottom of the container.

From the foregoing description and a study of the drawings it will be apparent that I have thus provided a simply constructed and consequently comparatively inexpensive device which will be highly efficient for the purpose specified and which will be not only a great time and labor saver but which will give accurate measure and have the further advantage of being sanitary and attractive.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A device of the character described comprising a shell adapted to receive a container having an open top, the container being placed within the shell in inverted position, a handle on the shell, a plunger movable within the shell and carrying a disk forming a seat for the bottom of the container, the shell being tapered, and expansible means carried by the disk and constantly bearing against the shell for supporting the container regardless of the diameter of the bottom thereof.

2. A device of the character described comprising a shell adapted to receive a container having an open top, the container being placed within the shell in inverted position, a handle on the shell, a plunger movable within the shell and carrying a disk forming a seat for the bottom of the container, the shell being tapered, and expansible means carried by the disk and constantly bearing against the shell for supporting the container regardless of the diameter of the bottom thereof, and spring means on the plunger applying pressure to said expansible means.

3. A device of the character described comprising a shell adapted to receive a container having an open top, the container being placed within the shell in inverted position, a handle on the shell, a slidable stem carrying a knob, a disk on the stem normally engaging the bottom of the container, and means on the shell for holding the container against displacement, and arcuate shoes on said disk movable there along to bear against the inner wall of the shell when the rod is moved.

4. A device of the character described comprising a shell adapted to receive a container having an open top, the container being placed within the shell in inverted position, a handle on the shell, a slidable stem carrying a knob, a disk on the stem normally engaging the bottom of the container, and means on the shell for holding the container against displacement, arcuate shoes slidably mounted upon said disk, a collar slidable on the stem and connected by links with said shoes, and a spring normally urging said collar toward the disk.

5. A device of the character described comprising a shell adapted to receive a container having an open top, the container being placed within the shell in inverted position, a handle on the shell, a slidable stem carrying a knob, a disk on the stem normally engaging the bottom of the container, and means on the shell for holding the container against displacement, consisting of a ring detachably engaged upon the open end of the shell and including a transverse member engaging the open top of the container, said ring projecting beyond the shell with said projecting edge beveled from both sides to define a cutting edge, and vent means carried by said transverse member for permitting exhaust of air from the container.

6. A device of the character described comprising a shell adapted to receive a container having an open top, the container being placed within the shell in inverted position, a handle on the shell, a slidable stem carrying a knob, a disk on the stem normally engaging the bottom of the container, and means on the shell for holding the container against displacement, consisting of a ring detachably engaged upon the open end of the shell and including a transverse member engaging the open top of the container, said ring projecting beyond the shell with said projecting edge beveled from both sides to define a cutting edge, and vent means carried by said transverse member for permitting exhaust of air from the container, including a tube carried by the transverse member extending co-axially of the shell, said transverse member being formed with a passage communicating with said tube and with a passage in the wall of the shell.

In testimony whereof I affix my signature.

PAUL H. DRUMM.